United States Patent

Takatori et al.

Patent Number: 5,550,950
Date of Patent: Aug. 27, 1996

[54] VOICE TRANSFER SYSTEM WITH LOW-ERROR VOICE SIGNAL REGENERATION

[75] Inventors: Sunao Takatori; Makoto Yamamoto, both of Tokyo, Japan

[73] Assignees: Yozan Inc., Tokyo; Sharp Corporation, Osaka, both of Japan

[21] Appl. No.: 172,287

[22] Filed: Dec. 23, 1993

[30] Foreign Application Priority Data

Dec. 25, 1992 [JP] Japan ................................. 4-359397

[51] Int. Cl.⁶ ............................. G10L 3/02; G10L 9/00
[52] U.S. Cl. ........................................ 395/221; 395/2.14
[58] Field of Search ........................... 395/2, 2.1, 2.14, 395/2.79, 2.21; 381/36–40

[56] References Cited

U.S. PATENT DOCUMENTS

| | | | |
|---|---|---|---|
| 3,571,515 | 3/1971 | Buron et al. ............................... | 179/1 |
| 4,633,490 | 12/1986 | Goertzel et al. ......................... | 375/122 |
| 4,672,670 | 6/1987 | Wang et al. .............................. | 395/221 |
| 4,677,671 | 6/1987 | Galand et al. ........................... | 381/31 |
| 4,736,389 | 4/1988 | Debus, Jr. et al. ...................... | 375/59 |
| 4,790,015 | 12/1988 | Callens et al. ........................... | 381/31 |
| 4,905,297 | 2/1990 | Langdon, Jr. et al ................... | 382/56 |
| 4,935,882 | 6/1990 | Pennebaker et al. .................... | 364/200 |
| 4,973,961 | 11/1990 | Chamzas et al. ......................... | 341/51 |

*Primary Examiner*—Allen R. MacDonald
*Assistant Examiner*—Richemond Dorvil
*Attorney, Agent, or Firm*—Cushman, Darby & Cushman

[57] ABSTRACT

A voice transfer system for transferring a voice data signal extracts and regenerates frequency components from an original voice signal converted into digital voice data. In a voice transmitter, a plurality of frequency transformation units successively extract frequency components in stepwisely increasing frequency ranges from the converted voice signal and remove the frequency component from the signal supplied to the next frequency transformation unit. The frequency components are received by a voice receiver which reverse transforms each component and sums them to reconstruct a voice signal which differs from the original voice signal by a reduced error component.

1 Claim, 2 Drawing Sheets

VOICE TRANSFER SYSTEM WITH LOW-ERROR VOICE SIGNAL REGENERATION

FIELD OF THE INVENTION

This invention relates to a voice transfer system.

BACKGROUND OF THE INVENTION

Conventional modulation techniques such as Pulse Code Modulation (PCM), etc., are well known methods used to transfer compressed voice. However, these techniques are limited because the amount of information capable of being transferred thereby is insufficient to insure that the receiving side is able to generate a clear voice signal from the transferred information.

SUMMARY OF THE INVENTION

Accordingly, it is an object of the present invention to solve the conventional problems and to provide a voice transfer system wherein the receiving side is capable of regenerating clear voice.

A method of transferring voice data according to the present invention involves converting an original voice signal into a digital signal, then sequentially extracting and transferring stepwisely increasing frequency components of the converted voice signal. Each of the extracted frequency components are subtracted in sequential order from the converted voice signal on the sending side, resulting in a stepwisely decreasing error signal. The receiving side of the system according to this method reconstructs the voice signal from the stepwisely extracted frequency components. Thus, the amount of voice information transferred is increased and the error between the original voice signal and the reconstructed signal is reduced. Accordingly, a clear voice signal can be obtained.

DETAILED DESCRIPTION OF THE PREFERRED EMBODIMENT

A voice transfer system according to a preferred embodiment of the present invention is herein described with reference to the attached drawings.

Figure 1:
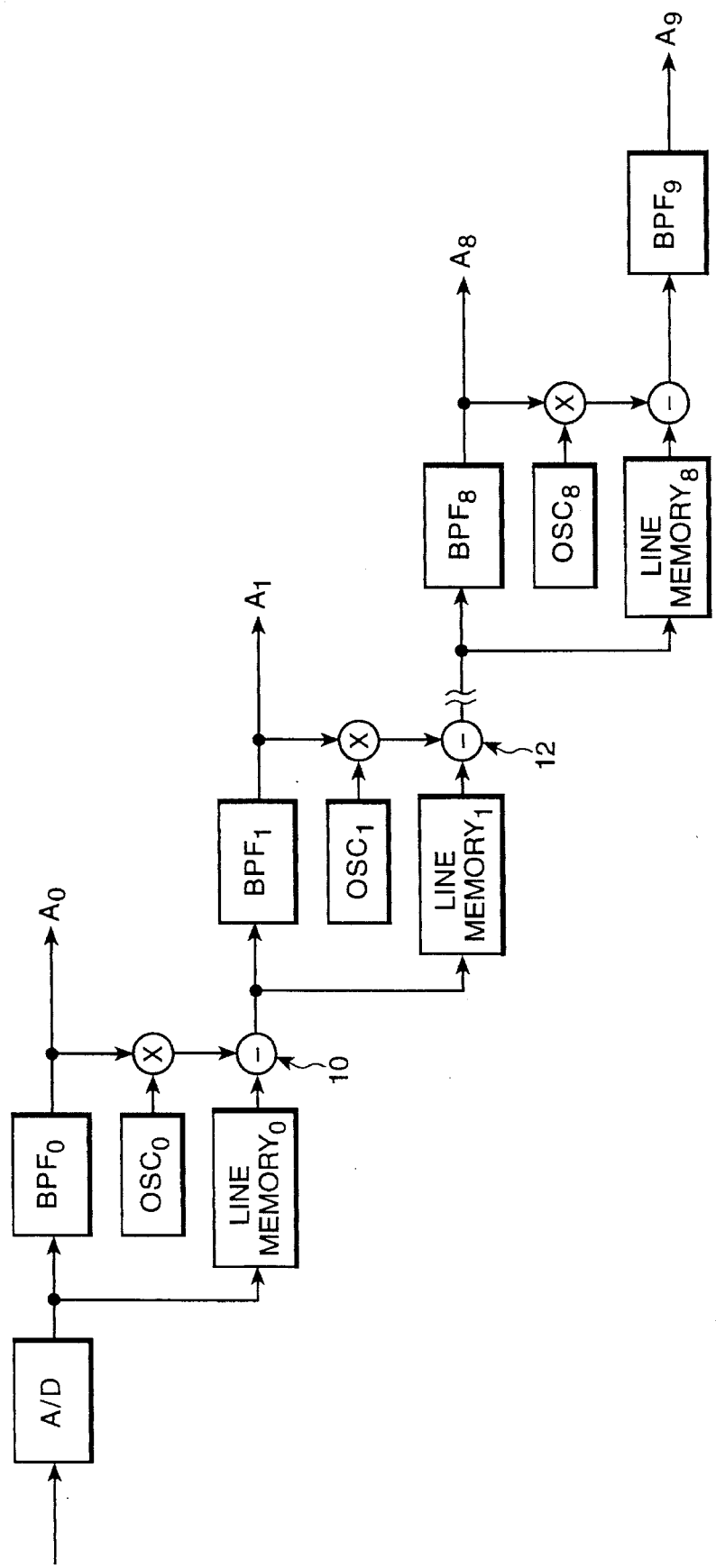
FIG. 1 is a block diagram of a transmitting side of a voice transfer system according to the present invention.
Figure 2:
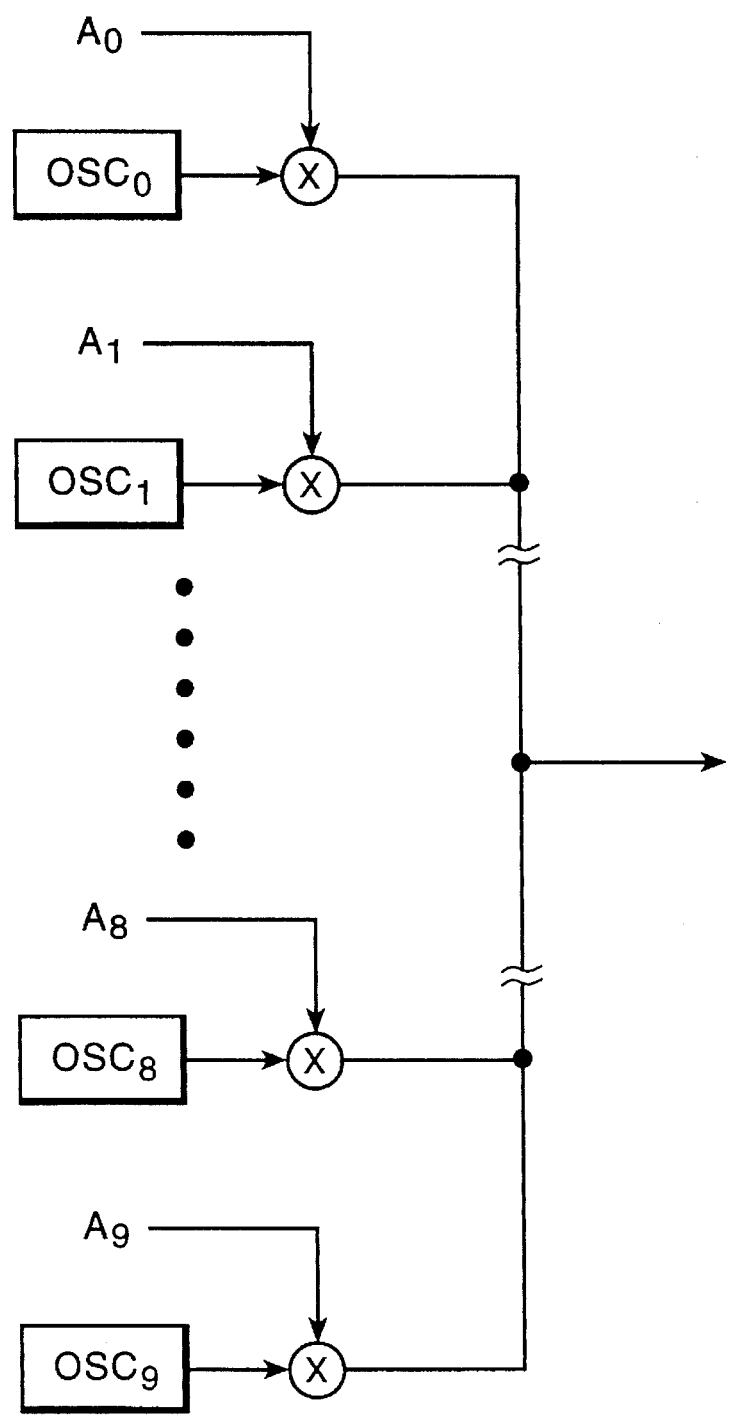
FIG. 2 is a block diagram of a receiving side of a voice transfer system according to the present invention.

FIG. 1 is a block diagram of a transmitting side of a voice transfer system according to the principles of the present invention. This system includes an analog/digital converter, a plural umber of band-pass filters $BPF_0$ to $BPF_9$, oscillators $OSC_0$ to $OSC_8$ and line memories $LINE\ MEMORY_0$ to $LINE\ MEMORY_8$. The receiving side is composed of a plural number of oscillators $OSC_0$ to $OSC_9$ (FIG. 2).

First, voice information, represented by an analog signal, is converted into a digital signal by the A/D converter. Here, the digital signal of the converted voice is shown by $DATA_0$. The digital signal $DATA_0$ is supplied to a band-pass filter $BPF_0$ corresponding to 120 Hz, for example, and a line memory $LINE\ MEMORY_0$.

The band-pass filter $BPF_0$ executes frequency transformation so as to extracts frequency components of about 120 Hz from digital signal $DATA_0$. The extracted frequency component from the band-pass filter $BPF_0$ is defined as $A_0$ and is transmitted to the receiving side.

The receiving side receives the frequency component $A_0$ reverse-transforms the frequency component for use in reconstructing the voice signal by an oscillator $OSC_0$. The regenerated voice data is defined as $D(R)_0$.

Likewise, the sending side also reverse-transforms the frequency component $A_0$ by an oscillator $OSC_0$ identical to that of the receiving side. Naturally, the reverse-transformed data also becomes $D(R)_0$. This data signal is in turn supplied to subtractor 10.

Data transformed by the oscillator $OSC_0$ is only a frequency component $A_0$ about 120 Hz, for example. Accordingly, there is an error between $DATA_0$ and $D(R)_0$. If this error is defined as $E_0$, then the following formula (1) is defined.

$$DATA_0 = D(R)_0 + E_0 \qquad (1)$$

$D(R)0$ is subtracted from data $DATA_0$ stored in $LINE\ MEMORY_0$ by the subtractor 10. The data, i.e., $E_0$ from the above formula (1), is defined as $DATA_1$ and transferred to $BPF_1$ and stored in $LINE\ MEMORY_1$. This is shown by the following formula (2).

$$DATA_0 - D(R)_0 = DATA_1 \qquad (2)$$

A band-pass filter $BPF_1$ extracts a higher frequency component than $BPF_0$. Supplied with $DATA_1$, band-pass filter $BPF_1$ extracts the higher component therefrom and transmits the frequency component, of about 250 Hz, for example, as $A_1$ to the receiving side.

The receiving side receives $A_1$ and reverse-transforms the frequency component for use in reconstructing the voice signal by oscillator $OSC_1$. The voice data is defined as $D(R)_1$.

Likewise, on the sending side, the frequency component $A_1$ is also reverse-transformed by an oscillator $OSC_1$ of the sending side. This reverse-transformed data becomes $D(R)_1$, and is fed back to the sending side through subtractor 12.

Data regenerated by $OSC_1$ has only component of 250 Hz for example. Accordingly, there is an error between $DATA_1$ and $D(R)_1$.

If the error is defined as $E_1$, then the following formula (3) is defined.

$$DATA_1 = D(R)_1 + E_1 \qquad (3)$$

$D(R)_1$ is subtracted from data $DATA_1$, which is stored at $LINE\ MEMORY_1$. An error $E_1$ mentioned above results, defined as data $DATA_2$, and is supplied to $BPF_2$ and stored at $LINE\ MEMORY_2$ (Figure is omitted.) The data $DATA_2$ is defined by the following formula (4).

$$DATA_1 - D(R)_1 = DATA_2 \qquad (4)$$

For the higher frequencies, the frequency transformation and reverse-transformation are executed similarly to the above. Thus, frequency components from $A_3$ to $A_9$ extracted by band-pass filters from $BPF_3$ to $BPF_9$, respectively, have frequency characteristics of increasing order. At the last $BPF_9$, a frequency component about 500 Hz, for example, is extracted, and frequency component $A_9$ is sent to the receiving side.

These processings are totally expressed by the following formula (5).

$$DATA_0 = D(R)_0 + D(R)_1 + \ldots + D(R)_8 + (E_0 + E_1 + \ldots + E_8) - (DATA_1 + DATA_2 + \ldots + DATA_8) \quad (5)$$

The receiving side executes the reverse transformation of frequency components from $A_0$ to $A_9$ sent from the transmitting side by $OSC_0$ to $OSC_9$, and each data signal from $D(R)_0$ to $D(R)_9$ obtained thereby is added together to reconstruct the original voice data.

According to the preferred embodiment, comparatively low level frequency component $A_0$ is first extracted from the original voice information $DATA_0$ and used to regenerate $D(R)_0$. Error signal $E_0$ is formed when regenerated data $D(R)_0$ is subtracted from $DATA_0$. Higher frequency components are sequentially extracted from this error signal and regenerated so that the error in the regenerated voice signal becomes progressively small.

As described above, voice transfer system according to the present invention extracts and regenerates a comparatively low level frequency component from the original voice signal converted into a digital signal, and is fed back to generate an error between the original voice and the regenerated voice data. The error data is used to sequentially extracting higher frequency components. By repeating these processings, the error signal becomes progressively small. When the extracted frequency components are sent to a receiving side and used to reconstruct the voice signal, the resulting signal is capable of generating a clear voice.

What is claimed is:

1. Voice transfer system comprising:
   i) a voice transmitter for transmitting voice data, said voice transmitter including a plurality of frequency transformation units which process respective ones of a plurality of different frequency ranges, each of said frequency ranges corresponding to one of a plurality of frequencies stepwise increasing from a lowest frequency to a highest frequency, said voice data being supplied to one of said frequency transformation units corresponding to said lowest frequency, and the remainder of said frequency transformation units being sequentially connected in an increasing order of said frequencies such that each of said frequency transformation units receives an output from a frequency transformation unit corresponding to a lower one of said frequencies, each of said frequency transformation units including:
      a) a band pass filter which extracts a frequency component corresponding to said respective one of said frequency ranges, said band pass filter of said one of said frequency transformation units corresponding to said lowest frequency receiving said voice data as an input data, said band pass filter of the remaining frequency transformation units receiving an output from a frequency transformation unit corresponding to said lower one of said frequencies as said input data;
      b) an oscillator which receives an output of said band pass filter and which executes reverse frequency transformation for said frequency component so as to generate a regenerated voice data;
      c) a line memory which holds said input data received by said band pass filter and outputs said input data synchronously with the generation of said regenerated voice data; and
      d) a subtractor which forms a difference signal between said input data held by said line memory and said regenerated voice data generated by said oscillator and which provides said difference signal as an output of said frequency transformation unit; and
   ii) a voice receiver which receives said frequency components extracted by each of said frequency transformation units of said voice transmitter, said voice receiver including:
      a) a plurality of oscillators corresponding to said oscillator of each of said frequency transformation units, each of said plurality of oscillators receiving a corresponding one of said frequency components and executing reverse frequency transformation so as to generate a voice data component; and
      b) an addition circuit which sums each of said voice data components from said plurality of oscillators.

\* \* \* \* \*